United States Patent
Park

(10) Patent No.: US 9,384,539 B2
(45) Date of Patent: Jul. 5, 2016

(54) METHOD AND DEVICE FOR PROCESSING DIGITAL IMAGE, AND COMPUTER-READABLE RECORDING MEDIUM

(71) Applicant: Intel Corporation, Santa Clara, CA (US)

(72) Inventor: Minje Park, Seongnam (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/883,932

(22) Filed: Oct. 15, 2015

(65) Prior Publication Data

US 2016/0035073 A1 Feb. 4, 2016

Related U.S. Application Data

(63) Continuation of application No. 14/343,134, filed as application No. PCT/KR2013/001200 on Feb. 15, 2013, now Pat. No. 9,189,837.

(30) Foreign Application Priority Data

Feb. 15, 2012 (KR) .................. 10-2012-0015544

(51) Int. Cl.
*G06K 9/34* (2006.01)
*G06T 5/40* (2006.01)
(Continued)

(52) U.S. Cl.
CPC ............... *G06T 5/40* (2013.01); *G06K 9/6212* (2013.01); *G06T 5/002* (2013.01); *G06T 5/009* (2013.01);
(Continued)

(58) Field of Classification Search
CPC .............. G06K 9/6212; G06T 2207/10016; G06T 2207/10144; G06T 2207/20208; G06T 2207/20212; G06T 5/009; G06T 5/40; G06T 5/50
See application file for complete search history.

(56) References Cited

U.S. PATENT DOCUMENTS 7,660,464 B1 * 2/2010 Peterson .................. G06T 5/50
382/181
8,355,595 B2 1/2013 Bressan
(Continued)

FOREIGN PATENT DOCUMENTS

EP 2395748 A2 6/2011
JP 2008-227697 9/2008
(Continued)

OTHER PUBLICATIONS

PCT Search Report, PCT/KR2013/001200, 1 page, Mar. 18, 2013.
(Continued)

*Primary Examiner* — Phuoc Tran
(74) *Attorney, Agent, or Firm* — Blakely, Sokoloff, Taylor & Zafman LLP

(57) ABSTRACT

There is provided a method of processing a digital image including: (a) obtaining a plurality of images; (b) converting the plurality of images into histograms; (c) setting one of the plurality of images as a reference image and another of the plurality of images as a comparison target image; (d) adjusting a distribution of the histogram of the reference image to match a distribution of the histogram of the comparison target image to produce an adjusted reference image; (e) comparing a difference between the adjusted reference image and the comparison target image to produce a masking image; (f) applying the masking image to the comparison target image to produce an adjusted comparison target image; and (g) combining the reference image and the adjusted comparison target image to produce a high dynamic range (HDR) image. Accordingly, even if there is a complex motion on a subject, a clear image without an image overlap or a ghost effect may be obtained when producing the HDR image.

26 Claims, 8 Drawing Sheets

(51) Int. Cl.
  *G06T 5/00* (2006.01)
  *G06K 9/62* (2006.01)
  *G06T 5/50* (2006.01)
  *G06T 11/60* (2006.01)
  *H04N 5/235* (2006.01)

(52) U.S. Cl.
  CPC . *G06T 5/50* (2013.01); *G06T 11/60* (2013.01); *H04N 5/2353* (2013.01); *G06T 2207/10016* (2013.01); *G06T 2207/10144* (2013.01); *G06T 2207/20208* (2013.01); *G06T 2207/20212* (2013.01)

(56) References Cited

U.S. PATENT DOCUMENTS

| | | |
|---|---|---|
| 2004/0057632 A1 | 3/2004 | Gindele |
| 2009/0161953 A1* | 6/2009 | Ciurea ............... H04N 1/4074 382/172 |
| 2009/0322891 A1 | 12/2009 | Kondo et al. |

FOREIGN PATENT DOCUMENTS

| | | |
|---|---|---|
| JP | 2010-109948 | 5/2010 |
| JP | 2010-134915 | 6/2010 |
| JP | 2011-188277 | 9/2011 |

OTHER PUBLICATIONS

Jacobs et al., "Automatic HDRI Generation of Dynamic Environments", XP-002562044, Jul. 31, 2005, 1 page.

Moon et al., "A Simple Ghost-Free Exposure Fusion for Embedded HDR Imaging" Jan. 13, 2012, pp. 9-10.

Min et al., "Histogram Based Ghost Removal in High Dynamic Range Images", Jun. 28, 2009 IEEE 978-1-4244-4291-1, 530-533.

An, et al., "A Multi-Exposure Image Fusion Algorithm Without Ghost Effect", May 22, 2011, IEEE 978-1-4577-0539-7, 1565-1568.

Grosch, Thorsten, "Fast and Robust High Dynamic Range Image Generation with Camera and Object Movement", XP002612400, Nov. 22, 2006, pp. 1-9, ISBN: 978-3-89838-081-2.

Extended EP Search Report, 13749055.3-1906, Nov. 17, 2015, 9 pages.

* cited by examiner

FIG. 3
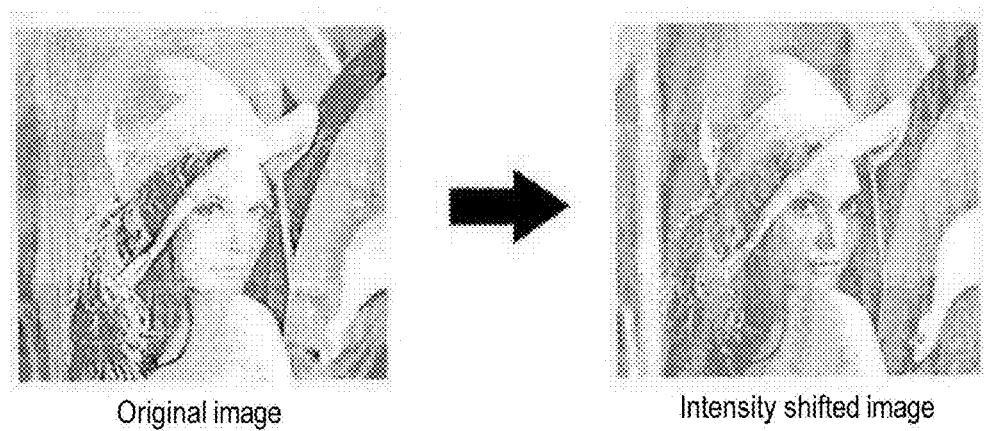
Original image → Intensity shifted image
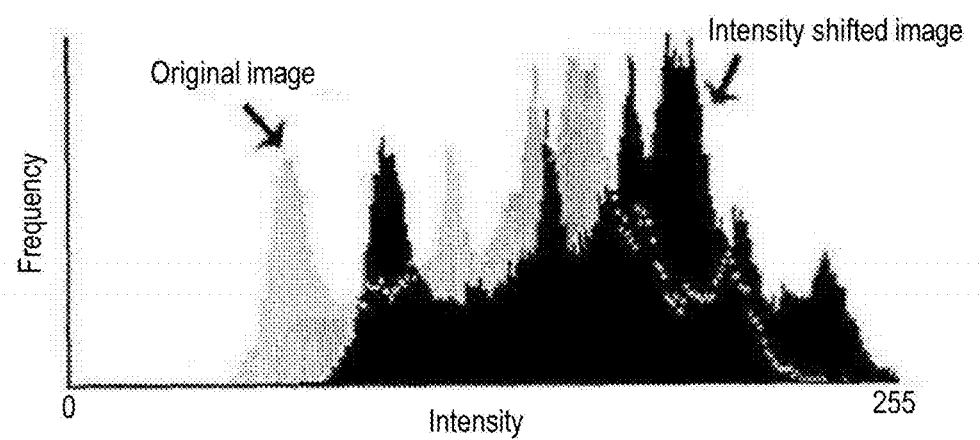

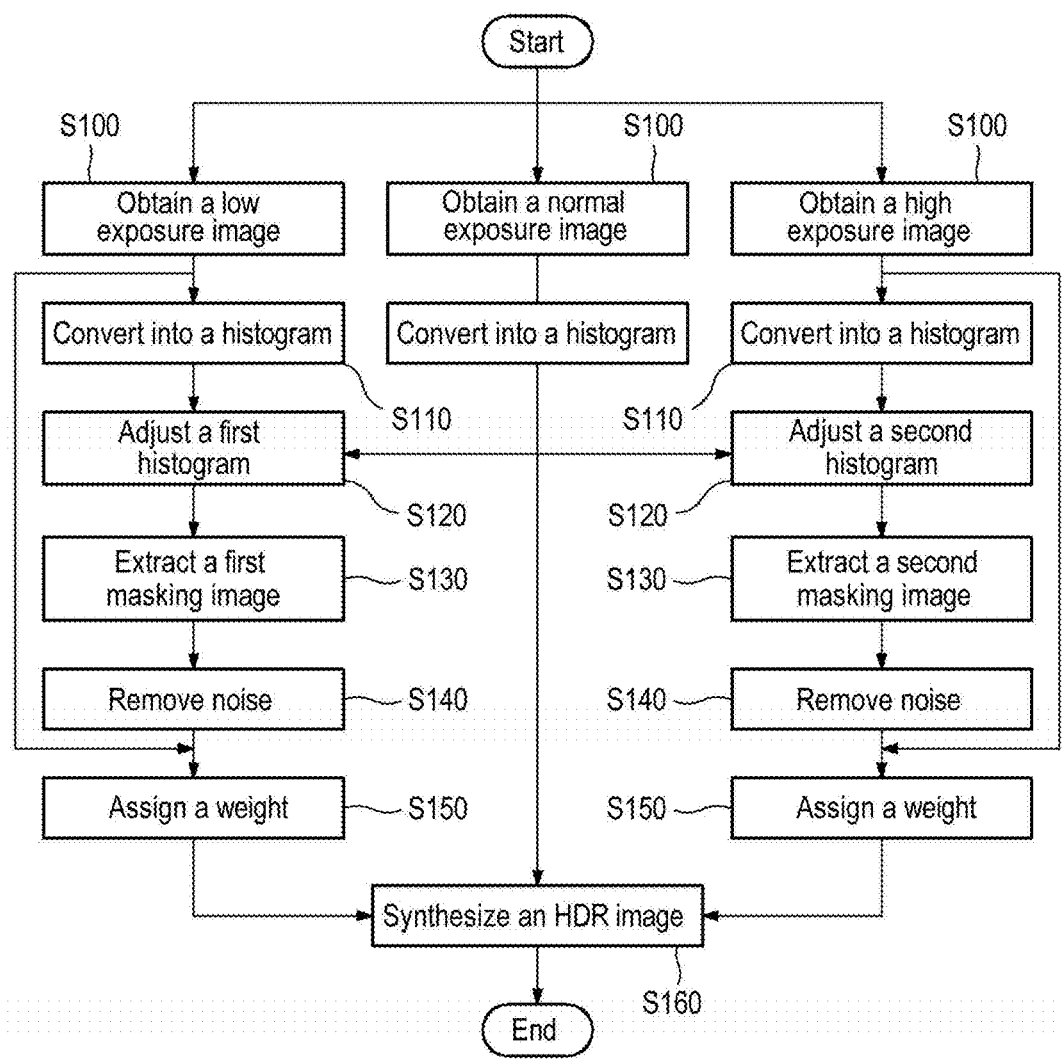

ural disclosure is to
METHOD AND DEVICE FOR PROCESSING DIGITAL IMAGE, AND COMPUTER-READABLE RECORDING MEDIUM The present patent application is a Continuation application claiming priority from application Ser. No. 14/343,134, filed Mar. 6, 2014 which is a U.S. National Phase Application under 35 U.S.C. 371 of International Application No. PCT/KR2013/001200 filed Feb. 15, 2013, which claims priority from Korean Application No. 10-2012-0015544, filed Feb. 15, 2012, the contents of which are incorporated herein in their entirety by reference.

TECHNICAL FIELD

The present disclosure relates to a method, apparatus, and computer-readable recording medium for processing a digital image, and more particularly, correcting motions of imaging devices and subjects and removing a ghost phenomenon.

BACKGROUND

The dynamic range (DR) of a digital image is defined as a ratio of the brightest pixel value with respect to the darkest pixel value in the image. The human visual system (HVS) is capable of processing a much higher dynamic range than typical digital cameras or monitors. Therefore, conventional imaging devices cannot capture or display images as humans perceive them. Accordingly, the demand has increased with regard to processing images having a greater dynamic range than the conventional imaging devices are capable of processing. These images are called high dynamic range (HDR) images.

The technology for generating an HDR image is to expand the dynamic range by combining a plurality of images with different exposure levels. The HDR image may be obtained by combing a number of short exposure images (SEI), which are obtained with a short exposure period based on a bright area, and a number of long exposure images (LEI), which are obtained with a long exposure period based on a dark area. In other words, when there are large differences in brightness between the areas of one image, an overall clear image can be obtained even from the image with large differences in brightness between its areas by capturing images of bright areas with a short exposure period and capturing images of dark areas with a long exposure period.

For such combining of multiple images, a plurality of images needs to be aligned and a difference in brightness at a stitched boundary of two images should be at an appropriate level. Further, the boundary between two different areas should look natural without artifacts. However, when images with noise or active motion are combined, it is very difficult to synthesize the images without decreasing dynamic ranges thereof and causing motion artifacts.

If a subject or a camera moves, the SEI and the LEI are made different and therefore a ghost effect may occur when an HDR image is synthesized. The ghost effect refers to a phenomenon in which, due to motion of a subject in a plurality of images, when the images are merged or stitched, the images are overlapped according to the motion of a subject.

To overcome the issue of the ghost effect as above, Korean Patent Application Publication No. 10-2011-0136152 published on Dec. 21, 2011, entitled "Apparatus and method creating ghost-free high dynamic range image (HDRI) using filtering" is disclosed.

The prior art above relates to an apparatus and method for creating ghost-free HDRI based on filtering, where a ghost area is not specifically determined in an image but the ghost area is defined using a probability based on a global transfer function that is a relationship function of intensities of a plurality of frames, and thereby prevents a ghost effect from occurring when a single HDRI is created from a plurality of low dynamic range images (LDRIs).

However, the prior art above has a problem that the calculation speed for extracting an HDR image is slowed down because a large number of exposure images are required to calculate the probability functions between consecutive exposure images in order to remove the ghost area.

PRESENT DISCLOSURE

It is an object of the present disclosure to solve all the aforementioned problems of the prior art.

In addition, it is an object of the present disclosure to produce a clear HDR image without an image overlap or a ghost effect even if there is a complex motion on a subject.

Further, another object of the present disclosure is to remove a ghost area using a small number of exposure images.

The representative configuration of the various embodiments of the present disclosure for achieving the aforementioned objects is described below.

According to an aspect of the present disclosure, there is provided a method of processing a digital image including: (a) obtaining a plurality of images; (b) converting the plurality of images into histograms; (c) setting one of the plurality of images as a reference image and another of the plurality of images as a comparison target image; (d) adjusting a distribution of the histogram of the reference image to be similar to a distribution of the histogram of the comparison target image to produce an adjusted reference image; (e) comparing a difference between the adjusted reference image and the comparison target image to produce a masking image; (f) applying the masking image to the comparison target image to produce an adjusted comparison target image; and (g) combining the reference image and the adjusted comparison target image to produce a high dynamic range (HDR) image.

According to another aspect of the present disclosure, there is provided a method of processing a digital image including: (a) obtaining a plurality of images; (b) converting the plurality of images into histograms; (c) setting one of the plurality of images as a reference image and two others of the plurality of images as a first comparison target image and a second comparison target image; (d) adjusting a distribution of the histogram of the reference image to be similar to distributions of the histograms of the first comparison target image and the second comparison target image respectively to produce a first adjusted reference image and a second adjusted reference image; (e) comparing a difference between the first adjusted reference image and the comparison target image to produce a first masking image and comparing a difference between the second adjusted reference image and the comparison target image to produce a second masking image; (f) applying the first masking image to the first comparison target image to produce a first adjusted comparison target image and applying the second masking image to the second comparison target image to produce a second adjusted comparison target image; and (g) combining the reference image and the first and second adjusted comparison target images to produce an HDR image.

According to another aspect of the present disclosure, there is provided an apparatus for processing a digital image including: an image obtaining unit configured to obtain a plurality of images; a histogram conversion unit configured to convert the plurality of images into histograms; an image classification unit configured to set one of the plurality of images as a reference image and another of the plurality of images as a comparison target image; a histogram adjustment unit configured to adjust a distribution of the histogram of the reference image to be similar to a distribution of the histogram of the comparison target image to produce an adjusted reference image; a masking image obtaining unit configured to compare a difference between the adjusted reference image and the comparison target image to produce a masking image; a comparison target image adjusting unit configured to apply the masking image to the comparison target image to produce an adjusted comparison target image; and an HDR image synthesizing unit configured to combining the reference image and the adjusted comparison target image to produce an HDR image.

According to another aspect of the present disclosure, there is provided an apparatus for processing a digital image including: an image obtaining unit for obtaining a plurality of images; a histogram conversion unit configured to convert the plurality of images into histograms; an image classification unit configured to set one of the plurality of images as a reference image and two others of the plurality of images as a first comparison target image and a second comparison target image; a histogram adjustment unit configured to adjust a distribution of the histogram of the reference image to be similar to distributions of the histograms of the first comparison target image and the second comparison target image respectively to produce a first adjusted reference image and a second adjusted reference image; a masking image obtaining unit configured to compare a difference between the first adjusted reference image and the comparison target image to produce a first masking image, and comparing a difference between the second adjusted reference image and the comparison target image to produce a second masking image; a comparison target image adjusting unit configured to apply the first masking image to the first comparison target image to produce a first adjusted comparison target image and applying the second masking image to the second comparison target image to produce a second adjusted comparison target image; and an HDR image synthesizing unit configured to combining the reference image and the first and second adjusted comparison target images to produce an HDR image.

In addition, other methods and apparatuses for implementing various embodiments of the present disclosure, and a computer-readable recording medium for recording a computer program for executing the other methods are provided.

According to the present disclosure, even if there is a complex motion on a subject, a clear image can be obtained without an image overlap or a ghost effect when producing an HDR image.

In addition, it is possible to improve the matching rate in a scene with active motion, whereby motion artifacts and a decrease in dynamic range in an HDR image can be reduced.

In addition, it is enough to use at least two exposure images in order to remove ghost areas and a large number of exposure images are not required to calculate probability functions between consecutive exposure images.

BRIEF DESCRIPTION OF DRAWINGS

FIG. 3 illustrates a histogram distribution according to the brightness of an image.

FIG. 4 is a flow diagram for processing a digital image according to an embodiment of the present disclosure.

DETAILED DESCRIPTION

Figure 1:
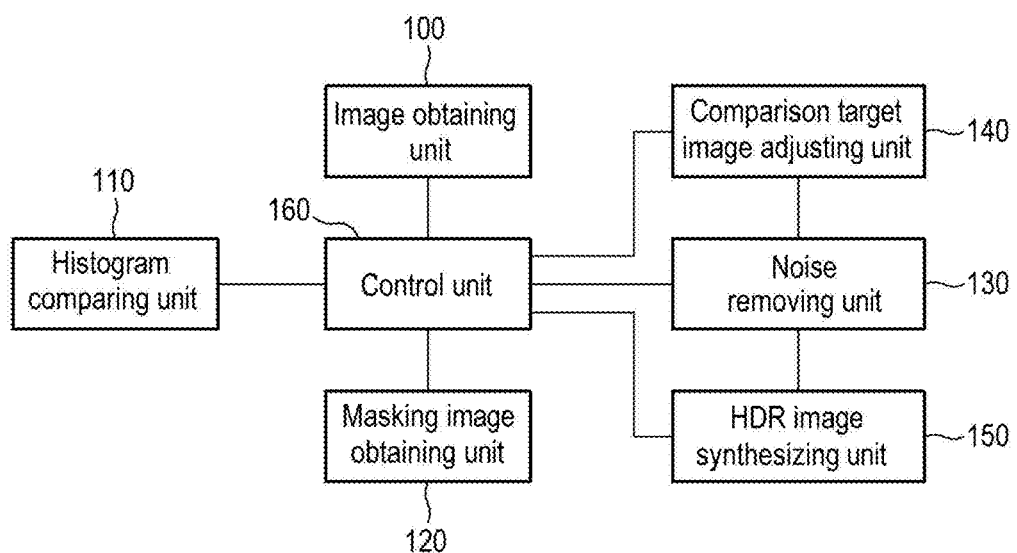
FIG. 1 is a block diagram illustrating a schematic configuration of an apparatus for processing a digital image according to an embodiment of the present disclosure.

In the following detailed description of the present disclosure, references are made to the accompanying drawings that show, by way of illustration, specific embodiments in which the present disclosure may be practiced. These embodiments are described in sufficient detail to enable those skilled in the art to practice the present disclosure. It is to be understood that various embodiments of the present disclosure, although different from one another, are not necessarily mutually exclusive. For example, a particular feature, structure, and characteristic described herein, in connection with one embodiment, may be implemented within other embodiments without departing from the spirit and scope of the present disclosure. Also, it is to be understood that the positions or arrangements of individual elements in the embodiment may be changed without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers refer to the same or similar function throughout.

Hereinafter, various embodiments of the present disclosure will be described in detail with reference to the accompanying drawings in order that those skilled in the art can easily implement the present disclosure.

Overall Apparatus Configuration:

FIG. 1 is a block diagram illustrating a schematic configuration of an apparatus for processing a digital image according to an embodiment of the present disclosure.

With reference to FIG. 1, the apparatus for processing a digital image includes an image obtaining unit 100, a histogram comparing unit 110, a masking image obtaining unit 120, a noise removing unit 130, a comparison target image adjusting unit 140, an HDR image synthesizing unit 150, and a control unit 160.

A plurality of images having different exposure times is obtained by the image obtaining unit 100. According to an embodiment explained in the following with reference to FIG. 4, the images obtained by the image obtaining unit 100 may comprise a low exposure image that is generally dark due to a short exposure time, a high exposure image that is generally bright due to a long exposure time, and a normal exposure image that has a brightness level between the low exposure image and the high exposure image. However, the present disclosure is not limited thereto and may be applied to a case where at least two images having different exposure times, such as a low exposure image and a high exposure image, are obtained by the image obtaining unit 100.

The histogram comparing unit 110 converts the images obtained by the image processing unit 100 into histograms, sets one of converted images as a reference image, and obtains an adjusted reference image by modifying the brightness of the reference image in order to match the reference image to the histogram of another image obtained by the image processing unit 100.

More specifically, the configuration of the histogram is explained with reference to FIG. 2.

Figure 2:
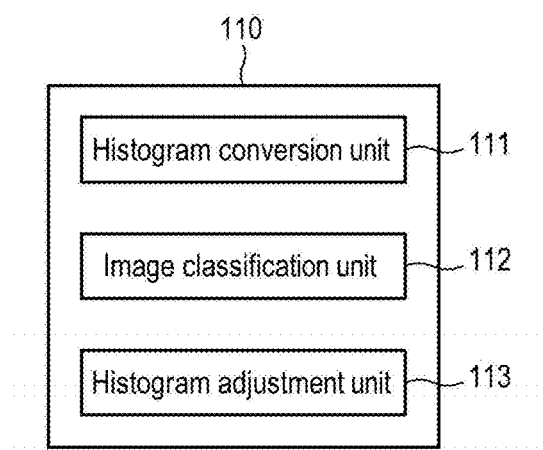
FIG. 2 is a block diagram illustrating a schematic configuration of a histogram comparing unit according to an embodiment of the present disclosure.

FIG. 2 is a block diagram illustrating a schematic configuration of a histogram comparing unit according to an embodiment of the present disclosure.

With reference to FIG. 2, the histogram comparing unit 110 includes a histogram conversion unit 111, an image classification unit 112, and a histogram adjustment unit 113.

The histogram conversion unit 111 converts a plurality of images obtained by the image obtaining unit 100 into histograms.

A "histogram" means a distribution of pixel levels of an image where each pixel in a digital image signal is classified and organized according to the level representing the brightness of each pixel. If an image is generally dark, its histogram is mainly distributed on the dark value (a value close to 0). Meanwhile, if an image is generally bright, its histogram is mainly distributed on the bright value (a value close to 255). FIG. 3 illustrates a distribution of the histogram according to the brightness of an image. With reference to FIG. 3, when an original image is modified to be brighter, it is confirmed that the pixel distribution is focused on brighter values on the histogram. Therefore, the histogram is appropriate for showing overall characteristics of an image rather than specific information regarding elements that constitute an object in the image. Also, the histogram is advantageous in that it is relatively not affected by geometrical modifications such as rotations or movements of an object and it is implemented through a simple algorithm.

The image classification unit 112 sets one of the plurality of images, which has been converted to a histogram by the histogram conversion unit 111, as a reference image. The reference image may be set from any of the low exposure image, high exposure image, or normal exposure image. For example, an image having uniform pixel distribution on its histogram may be set as the reference image.

Figure 5A:
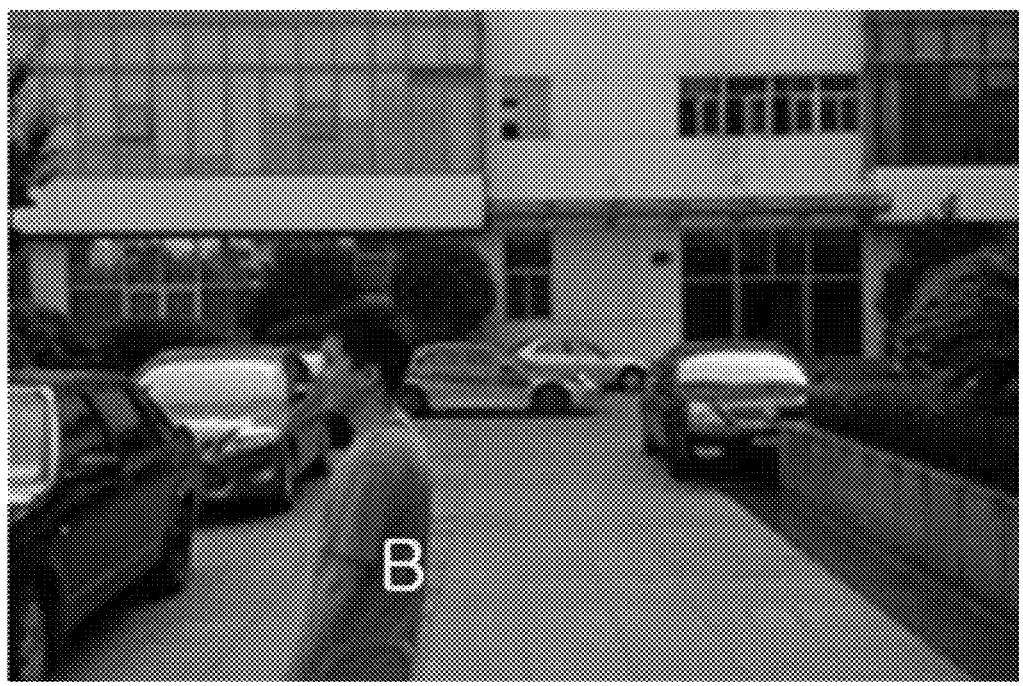
FIG. 5a illustrates an example of a low exposure image used in synthesizing an HDR image.
Figure 5B:
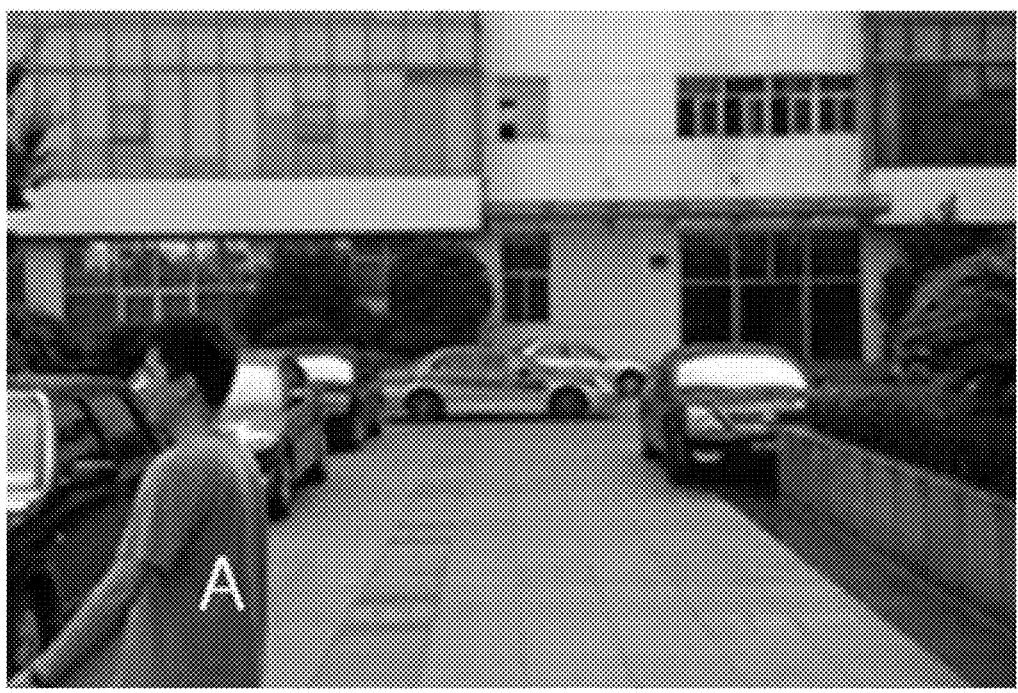
FIG. 5b illustrates an example of a normal exposure image used in synthesizing an HDR image.
Figure 5C:
FIG. 5c illustrates an example of a high exposure image used in synthesizing an HDR image.

FIG. 5a illustrates an example of a low exposure image used in synthesizing an HDR image; FIG. 5b illustrates an example of a normal exposure image used in synthesizing an HDR image; and FIG. 5c illustrates an example of a high exposure image used in synthesizing an HDR image. With reference to the embodiments shown in FIGS. 5a to 5c, an example is provided in which a normal exposure image whose pixels are evenly arranged in a dark area and a bright area rather than a low exposure image or a high exposure image is set as a reference image.

If the reference image is set, then the histogram adjustment unit 113 modifies the brightness of the reference image such that the distribution of the histogram of the reference image has a pixel arrangement similar to the distribution of the histogram of an image other than the reference image, i.e., the other image obtained by the image obtaining unit 100. Herein, the other image compared to the reference image is defined as a comparison target image. Therefore, if the normal exposure image from among the images shown in FIGS. 5a to 5c is set as a reference image, the low exposure image and high exposure image may be a comparison target image.

An adjusted reference image refers to a reference image having its brightness modified such that the distribution of the histogram of the reference image is similar to the distribution of the histogram of a comparison target image.

According to the method as above, an adjusted reference image can be produced by modifying the brightness of the reference image by the histogram comparing unit 110.

The masking image obtaining unit 120 compares the adjusted reference image and the comparison target image obtained by the image obtaining unit 100 and produces a masking image that corresponds to a difference between the two images. The masking image is, for example, a black and white image, and its brightness may be determined by comparing the difference between the adjusted reference image and the comparison target image for each pixel. With reference to FIGS. 5a to 5c as an example, if the normal exposure image is set as an adjusted reference image and the low exposure image is set as a comparison target image, since the area A where a person is positioned in the normal exposure image and the area B where a person is positioned in the low exposure image are different, the areas of the masking image corresponding to the areas A and B are represented darkly while the other areas of the masking image are represented brightly because there are small differences in the images. Therefore, if the masking image is then applied to the low exposure image, the areas A and B are masked and removed, and only the other areas may remain. Further, if the normal exposure image is set as an adjusted reference image and the high exposure image is set as a comparison target image, since only the area A where a person is positioned in the normal exposure image is different, the area of the masking image corresponding to the area A is represented darkly and the other areas of the masking image are represented brightly. Therefore, if the masking image is then applied to the high exposure image, the area A is masked and removed, and only the other areas may remain.

As above, the masking image is produced using the adjusted reference image in which the brightness of the reference image is modified to the level similar to that of the comparison target image, and thereby allowing to rule out the possibility of recognizing the difference from the brightness of natural light or a lighting as a difference due to a change in an object if the reference image and the comparison image are directly compared with each other. The masking image can be produced by determining only the change in objects between both images.

The masking image obtained by the masking image obtaining unit 120 may have a lot of noise since the image is obtained by comparing the adjusted reference image and the comparison target image at a binary level. The noise removing unit 130 removes the noise generated in the masking image. More specifically, the noise removing unit 130 smoothes the boundary of an object shown in an image by repeating at least once an erosion operation and a dilation operation.

The erosion and dilation operations are algorithms used in image processing for removing noise or filling a hole in a binary image. The erosion is an operation used to erode a layer from an object or a small particle or to remove unnecessary pixels or small particles in an image. That is, if there is an empty portion around the original image of a current pixel, then the current pixel of a new image is removed. The dilation is an operation used to expand some particles and add a layer to an object or a particle. That is, if there are pixels around the original image of a current pixel, then the current pixel of a new image is filled. As above, the dilation operation restores the eroded particle to its original size.

The erosion and dilation operations, which are a part of an operation group known as morphological operations, are neighboring operations for defining each pixel value according to a geometrical relation with a neighboring pixel. The erosion and dilation operations are classified into an opening and closing. In the opening operation, the dilation operation is performed after the erosion operation. In the closing operation, the erosion operation is performed after the dilation operation. The opening can be regarded as an algorithm for removing noise while the closing can be regarded as an algorithm for filling a hole in an image.

According to some embodiments, the erosion operation and the dilation operation can be conducted through the opening. However, it is not limited thereto and noise reduction may be conducted by a closing method.

After the noise of the masking image is removed by the noise removing unit 130, the comparison target image adjusting unit 140 applies the masking image to the comparison target image to produce an adjusted comparison target image, and determines a synthesis ratio of the adjusted comparison target image when the HDR image is synthesized, that is, a weight of the adjusted comparison target image. The weight may be determined as being different values for each pixel that constitutes the comparison target image and the value may be calculated as a difference value obtained by comparing the adjusted reference image and the comparison target image on histograms. In other words, the difference value, which is obtained by comparing each corresponding pixels of the adjusted reference image and the comparison target image on histograms, is normalized to be a value between 0 and 1 and the normalized value may be set as a weight.

As the difference between the adjusted reference image and the comparison target image becomes larger, the weight converges closer to 0 and the ratio of the adjusted comparison target image being combined is decreased when synthesizing the HDR image. As the difference between the adjusted reference image and the comparison target image becomes smaller, the weight converges closer to 1 and the ratio of the adjusted comparison target image being combined is increased when synthesizing the HDR image. This means that, as the difference between the adjusted reference image and the comparison target image becomes larger, the difference is determined as an afterimage and it is tended to be removed when producing the HDR image. Using the method above, it is possible to prevent a ghost effect with an afterimage in a finally synthesized HDR image. The HDR image synthesizing unit 150 combines the reference image and the adjusted comparison target image to synthesize a final HDR image. In the synthesis of the HDR image, the weight of the reference image may be set as 1, and the adjusted comparison target image may be applied with a weight calculated at the comparison target image adjusting unit 140.

The control unit 160 serves to control a data flow among the image obtaining unit 100, the histogram comparing unit 110, the masking image obtaining unit 120, the noise removing unit 130, the comparison target image adjusting unit 140, and the HDR image synthesizing unit 150.

That is, the control unit 160 controls a data flow between elements of the apparatus for processing a digital image or a data flow to/from the outside, and thereby controls each of the image obtaining unit 100, the histogram comparing unit 110, the masking image obtaining unit 120, the noise removing unit 130, the comparison target image adjusting unit 140, and the HDR image synthesizing unit 150 to perform their intrinsic functions.

The components illustrated may be implemented respectively as an independent hardware or can be implemented as a single hardware as a whole. For example, each of the image processing units may be implemented as a Field Programmable Gate Array (FPGA) or a Gate Array (GA). In another embodiment, the components illustrated may be implemented as computers and programmed codes. In another embodiment, the components illustrated may be implemented as a digital signal processing processor and instructions set executed by the processor within an analog camera, a digital camera or a camcorder.

FIG. 4 is a diagram for explaining a method of processing a digital image according to an embodiment of the present disclosure.

With reference to FIG. 4, processing a digital image may be initiated by the step of obtaining a plurality of images having different exposure times by the image obtaining unit 100 (S100). For example, the plurality of images may comprise a low exposure image, a high exposure image, and a normal exposure image. However, the present disclosure is not limited thereto and the method of processing a digital image according to the present disclosure may be applied even if there are simply at least two images having different exposure times, such as a low exposure image and a high exposure image.

Figure 6A:
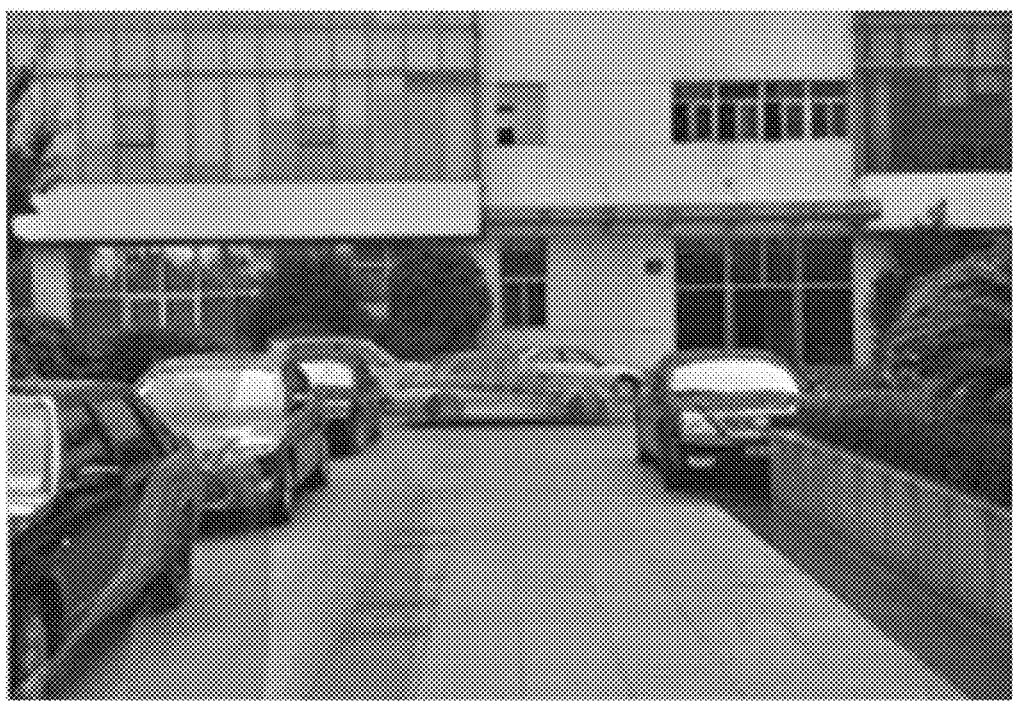
FIG. 6a illustrates an image synthesized from the images shown in FIGS. 5a to 5c according to a conventional method of synthesizing an HDR image.

With reference to the images shown in FIGS. 5a to 5c, a person is located in the middle of the image in the low exposure image shown in FIG. 5a; the person is located in the left side of the image in the normal exposure image shown in FIG. 5b; and the person does not appear in the high exposure image shown in FIG. 5c. In summary, it can be understood that the person has been moving from the middle to the left side. Conventionally, when synthesizing the HDR image, the low exposure image, the normal exposure image, and the high exposure image are simply combined. Therefore, there existed a problem that if there is a moving object in the images as shown in FIGS. 5a to 5c, an afterimage may remain and a clear HDR image cannot be obtained. FIG. 6a illustrates an image synthesized from the images shown in FIGS. 5a to 5c, according to a conventional method of synthesizing an HDR image. As can be seen from FIG. 6a, it is confirmed that a clear HDR image cannot be obtained since the afterimage of a moving person remains in the finally synthesized image.

To solve the aforementioned problem, the above plurality of images may be processed by converting them into histograms by the histogram conversion unit 111 (S110). After each of the plurality of images is converted into a histogram, one of the plurality of images is set as a reference image. It is likely for the low exposure image to have pixels focused on a dark area on the histogram and for the high exposure image to have pixels focused on a bright area on the histogram. Further, it is likely for the normal exposure image to have pixels uniformly distributed over the whole area including a dark area and a bright area.

Thus, the normal exposure image may be set as a reference image, and the brightness of the normal exposure image is modified such that a distribution of the histogram of the normal exposure image and a distribution of the low exposure image or the high exposure image are made more similar than a preset similarity therebetween (S120). The normal exposure image may be set as a reference image because it is likely to have pixels widely distributed over a dark area and a bright area and is therefore regarded as having relatively much more information than other images. Therefore, if the distribution of the histogram of the normal exposure image is modified to match the distribution of the histogram of the low exposure image or the high exposure image, it is possible to reduce an error such as a staircase effect, which may occur when a low information image is matched to a high information image.

However, when a subject is photographed in a relatively bright environment, the high exposure image may contain relatively more information as compared to the normal exposure image. In such cases, the high exposure image may be set as a reference image and the distribution of the histogram of the high exposure image may be modified to match the distribution of the histogram of the low exposure image or the normal exposure image.

In the embodiment shown in FIG. 4, adjusting the distribution of the histogram of the normal exposure image, which is a reference image, to match the distribution of the histogram of the low exposure image is defined as a first histogram adjustment, and adjusting the distribution of the histogram of the normal exposure image to match the distribution of the histogram of the high exposure image is defined as a second histogram adjustment.

However, since the present disclosure can be implemented when there exists a reference image and at least one comparison target image, even if there exist only a low exposure image and a high exposure image, the present disclosure can be implemented by setting one of the two images as a reference image and the other as a comparison target image.

Since pixel differences based on brightness between the adjusted reference image and the comparison target image can be ignored by the modification of the reference image, pixel differences between the adjusted reference image and the comparison target image can be determined as differences due to the motion of an object. Accordingly, a masking image can be produced from the difference between the comparison target image and the adjusted reference image by using the adjusted reference image as a masking (S130). In this regard, the masking image is an image showing only the pixels having differences between the adjusted reference image and the comparison target image due to the motion of an object. In the embodiment shown in FIG. 4, the image produced by masking the low exposure image with the adjusted reference image is defined as a first masking image, and the image produced by masking the high exposure image with the adjusted reference image is defined as a second masking image.

The masking image obtained by the masking image obtaining unit 120 may have a lot of noise since the image is obtained by comparing the adjusted reference image and the comparison target image at a binary level. Therefore, the noise generated in the masking image is removed by the noise removing unit 130 (S140). More specifically, the noise may be removed by repeating at least once an erosion operation and a dilation operation. However, such noise removing step is not necessarily required.

After the noise of the masking image is removed by the noise removing unit 130, the comparison target image adjusting unit 140 applies the masking image to the comparison target image to produce an adjusted comparison target image, and assigns a weight to the adjusted comparison target image (S150). The weight may be obtained by comparing the adjusted reference image and the comparison target image on histograms to obtain a difference value and normalizing it to be a value between 0 and 1. In the above, as the difference between the adjusted reference image and the comparison target image becomes larger, the weight converges closer to 0, and as the difference between the adjusted reference image and the comparison target image becomes smaller, the weight converges closer to 1.

Finally, the reference image and the adjusted comparison target image are combined by the HDR image synthesizing unit 150 to produce an HDR image (S170). In summary, when producing the HDR image, pixels of the reference image are used as they are for the pixels of the HDR image corresponding to the motion of an object, while images having different exposure values are combined for the other pixel portions of the HDR image.

Figure 6B:
FIG. 6b illustrates an HDR image produced by combining a reference image and a masking image according to an embodiment of the present disclosure.

FIG. 6b illustrates an HDR image that is finally synthesized by the method above. Referring to FIG. 6b with comparison to FIG. 6a illustrating an image that is produced by a conventional method of synthesizing an HDR image, it is confirmed that a clear image with hardly any afterimage can be obtained even though a person has moved. Therefore, it is possible to obtain a clear HDR image where a ghost effect, such as overlapping of areas having motions of an object as shown in the image of FIG. 6a, is removed by using the present disclosure.

The embodiments according to the present disclosure described above can be implemented in the form of program instructions that can be executed through various computer components and recorded in a computer-readable recording medium. The computer-readable recording medium may include a program instruction, a data file, a data structure, or a combination thereof. The program instruction recorded in the computer-readable recording medium may be a program instruction specially designed and configured for the present disclosure or a program instruction known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a floptical disk, and a hardware device specially configured to store and execute program instructions, such as a ROM, a RAM, a flash memory and the like. The program instruction includes, for example, a high-level language code that can be executed by a computer using an interpreter or the like, as well as a machine code generated by a compiler. The above-described hardware devices can be configured to operate using one or more software modules in order to perform the processing according to the present disclosure, and vice versa.

In the foregoing discussion, although the present disclosure has been described in connection with the specific matters, such as the specific components, the embodiments, and the drawings, they are provided only for assisting in the understanding of the present disclosure, and the present disclosure is not limited to those embodiments. It will be apparent that those skilled in the art can make various modifications and changes thereto from these descriptions.

Therefore, the spirit of the present disclosure should not be limited to the aforementioned embodiments, and the appended claims and what are modified equally or equivalently thereto will be considered to fall within the scopes of the present disclosure.

INDUSTRIAL APPLICABILITY

The present disclosure can be used in a digital image processing apparatus.

The invention claimed is:
1. A method of processing a digital image, comprising:
receiving a plurality of images;
converting the plurality of images into histograms;
setting a first of the plurality of images as a reference image;
setting a second of the plurality of images as a comparison target image;
generating an adjusted reference image based on the reference image and the comparison target image;

generating a masking image based on the adjusted reference image and the comparison target image;

generating an adjusted comparison target image by applying the masking image to the comparison target image; and combining the reference image and the adjusted comparison target image to generate a high dynamic range (HDR) image.

2. The method of claim 1, wherein generating the adjusted reference image comprises adjusting a distribution of the histogram of the reference image to be similar to a distribution of the histogram of the comparison target image.

3. The method of claim 2, wherein generating the masking image comprises comparing a difference between the adjusted reference image and the comparison target image to produce a masking image.

4. The method of claim 3, wherein the masking image is an image that represents a difference in brightness between the adjusted reference image and the comparison target image by comparing the adjusted reference image and the comparison target image for each pixel.

5. The method of claim 1, wherein the plurality of images comprises a low exposure image obtained with a short exposure time and a high exposure image obtained with a long exposure time.

6. The method of claim 1, wherein setting the reference image and setting the comparison target image comprises setting an image, in which pixels are relatively uniformly arranged from a dark area to a bright area on a histogram, as the reference image.

7. The method of claim 1, wherein generating the HDR image comprises assigning a weight to the adjusted comparison target image and then combining the adjusted comparison target image with the reference image.

8. The method of claim 7, wherein the weight is determined as a difference value of each pixel, which is obtained by comparing the adjusted reference image and the comparison target image on histograms and is normalized to be a value between 0 and 1.

9. The method of claim 8, wherein the weight converges to 0 as the difference between the adjusted reference image and the comparison target image is the larger and the weight converges to 1 as the difference between the adjusted reference image and the comparison target image is the smaller.

10. The method of claim 1, further comprising removing noise in the masking image.

11. The method of claim 10, wherein removing the noise comprises processing an image by repeating at least once an erosion operation, a dilation operation and a smoothing operation.

12. An apparatus for processing a digital image, comprising:
one or more processors to execute:
an image obtaining unit to obtain a plurality of images;
a histogram conversion unit to convert the plurality of images into histograms;
an image classification unit to set a first of the plurality of images as a reference image and a second of the plurality of images as a comparison target image;
a histogram adjustment unit to adjust a distribution of the histogram based on the reference image and the comparison target image;
a masking image obtaining unit to generate a masking image based on the adjusted reference image and the comparison target image;
a comparison target image adjusting unit to apply the masking image to the comparison target image to generate an adjusted comparison target image; and
an HDR image synthesizing unit to combining the reference image and the adjusted comparison target image to generate an HDR image.

13. The method of claim 12, wherein the histogram adjustment unit adjusts a distribution of the histogram of the reference image to be similar to a distribution of the histogram of the comparison target image.

14. The method of claim 12, wherein the masking image obtaining unit compares a difference between the adjusted reference image and the comparison target image to produce a masking image.

15. The apparatus of claim 12, wherein the plurality of images comprises a low exposure image obtained with a short exposure time and a high exposure image obtained with a long exposure time.

16. The apparatus of claim 12, wherein the image classification unit sets an image, in which pixels are relatively uniformly arranged from a dark area to a bright area on a histogram, as the reference image.

17. The apparatus of claim 12, wherein the masking image is an image which represents a difference in brightness between the adjusted reference image and the comparison target image by comparing the adjusted reference image and the comparison target image for each pixel.

18. The apparatus of claim 12, wherein the comparison target image adjusting unit assigns a weight to the adjusted comparison target image and then combining the adjusted comparison target image with the reference image.

19. The apparatus of claim 18, wherein the weight is determined as a difference value, which is obtained by comparing the adjusted reference image and the comparison target image on histograms and is normalized to be a value between 0 and 1.

20. The apparatus of claim 19, wherein the weight converges to 0 as the difference between the adjusted reference image and the comparison target image is the larger and the weight converges to 1 as the difference between the adjusted reference image and the comparison target image is the smaller.

21. The apparatus of claim 12, further comprising a noise removing unit configured to remove noise in the masking image.

22. The apparatus of claim 21, wherein the noise removing unit processes an image by repeating at least once an erosion operation, a dilation operation and a smoothing operation.

23. A non-transitory computer-readable recording medium for recording a computer program having instructions, which when executed by a processor, cause the processor to:
receive a plurality of images;
convert the plurality of images into histograms;
set a first of the plurality of images as a reference image;
set a second of the plurality of images as a comparison target image;
generate an adjusted reference image based on the reference image and the comparison target image;
generate a masking image based on the adjusted reference image and the comparison target image;
generate an adjusted comparison target image by applying the masking image to the comparison target image; and
combine the reference image and the adjusted comparison target image to generate a high dynamic range (HDR) image.

24. The CRM of claim 23, wherein the plurality of images comprises a low exposure image obtained with a short exposure time and a high exposure image obtained with a long exposure time.

25. The CRM of claim 23, wherein the masking image is an image which represents a difference in brightness between the adjusted reference image and the comparison target image by comparing the adjusted reference image and the comparison target image for each pixel.

26. The CRM of claim 23, wherein the weight is determined as a difference value of each pixel, which is obtained by comparing the adjusted reference image and the comparison target image on histograms and is normalized to be a value between 0 and 1.

* * * * *